US008200289B2

(12) United States Patent                    (10) Patent No.:     US 8,200,289 B2
Joo et al.                                    (45) Date of Patent:      Jun. 12, 2012

(54) PORTABLE TERMINAL

(75) Inventors: Won Seok Joo, Seoul (KR); Kwang Hyun Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 1006 days.

(21) Appl. No.: 11/764,706

(22) Filed: Jun. 18, 2007

(65) Prior Publication Data

US 2008/0227501 A1     Sep. 18, 2008

(30) Foreign Application Priority Data

Mar. 16, 2007 (KR) .................. 10-2007-0026329

(51) Int. Cl.
*H04M 1/00*    (2006.01)
(52) U.S. Cl. .............. 455/566; 379/433.01; 379/433.02; 379/430
(58) Field of Classification Search ............. 379/433, 379/434, 444, 433.01, 433.02, 430; 381/67, 381/396, 400; 340/407, 7; 455/344, 575, 455/351, 348, 566; 382/67, 396, 400
See application file for complete search history.

(56) References Cited

U.S. PATENT DOCUMENTS

| 6,728,374 | B1 * | 4/2004 | Takeda | 379/433.02 |
| 7,346,371 | B2 * | 3/2008 | Tomatsu | 455/558 |
| 7,565,184 | B2 * | 7/2009 | Lee et al. | 455/575.1 |
| 2002/0198021 | A1 * | 12/2002 | Boesen | 455/556 |
| 2005/0012723 | A1 * | 1/2005 | Pallakoff | 345/173 |
| 2005/0113156 | A1 * | 5/2005 | Park et al. | 455/575.4 |
| 2006/0018488 | A1 * | 1/2006 | Viala et al. | 381/74 |
| 2006/0132382 | A1 * | 6/2006 | Jannard | 345/8 |
| 2006/0286998 | A1 * | 12/2006 | Fukuda | 455/550.1 |
| 2007/0191070 | A1 * | 8/2007 | Rao | 455/566 |
| 2008/0004083 | A1 * | 1/2008 | Ohki et al. | 455/566 |

FOREIGN PATENT DOCUMENTS

CN       1843019 A      10/2006

* cited by examiner

*Primary Examiner* — Nick Corsaro
*Assistant Examiner* — Mahendra Patel
(74) *Attorney, Agent, or Firm* — Birch, Stewart, Kolasch & Birch, LLP (57) ABSTRACT

A portable terminal in provided. The portable terminal includes a body having a front surface, the front surface having an upper portion and a lower portion, a display unit located in the body and visible at the front surface thereof, the display unit having a first end and a second end, and at least one of the first end being adjacent the upper portion and the second end being adjacent the lower portion, and a speaker unit located in the body, the speaker unit including a bone conduction speaker.

17 Claims, 7 Drawing Sheets

PORTABLE TERMINAL

CROSS REFERENCE TO RELATED APPLICATIONS

This application claims the benefit of Korean Patent Application No. 10-2007-0026329, filed Mar. 16, 2007, and is herein incorporated by reference.

BACKGROUND OF THE INVENTION

1. Field of the Invention

The present invention relates to a portable terminal, and more particularly to a portable terminal that is small in size but implements a large display.

2. Description of Related Art

Figure 1:
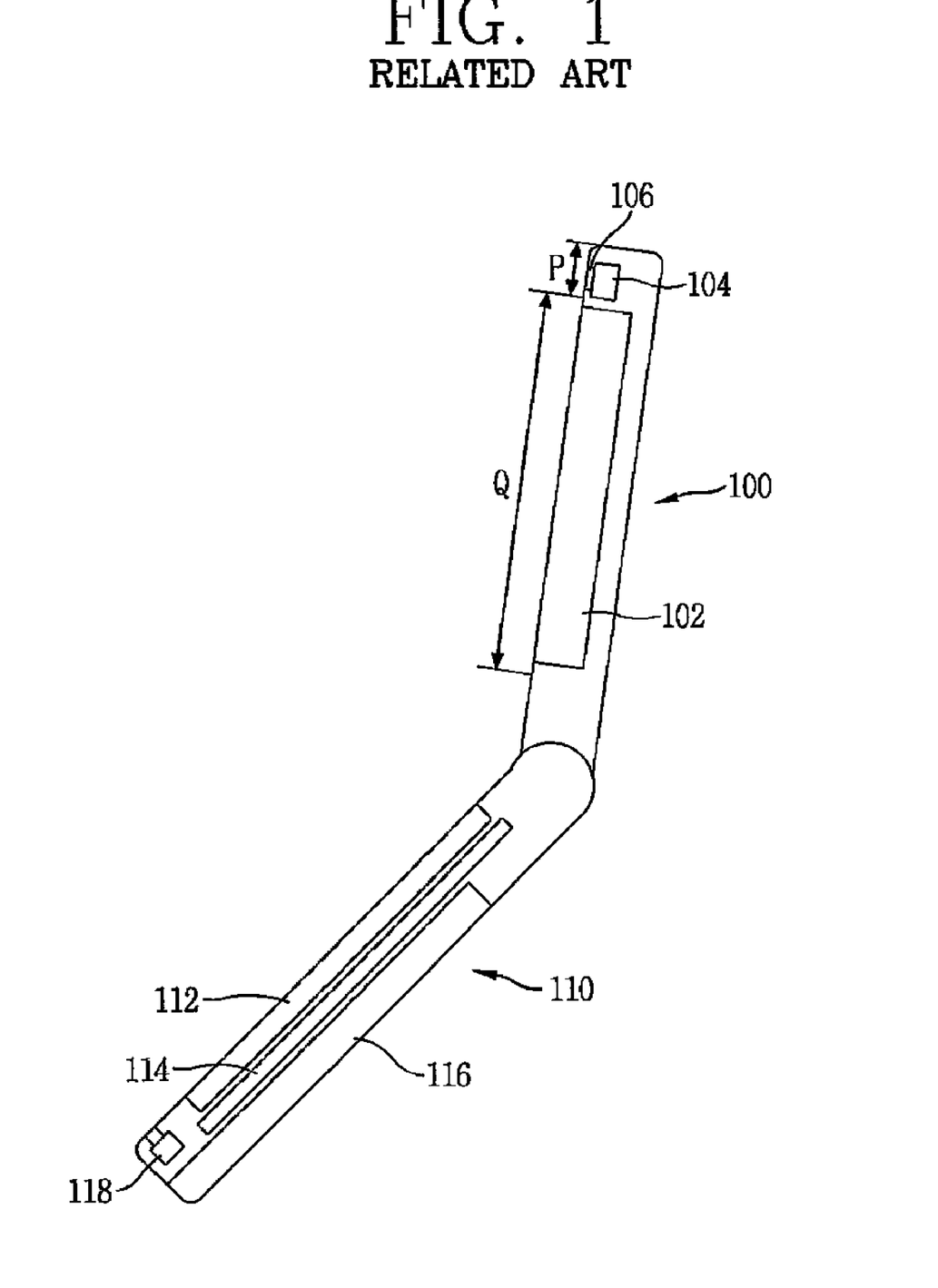
FIG. 1 is a schematic sectional view showing a portable terminal according to the related art.

FIG. 1 is a schematic sectional view showing a portable terminal according to the related art. The portable terminal according to the related art includes a first body 100 having a display 102 configured to display information and a speaker 104 configured to emit a sound to the exterior of the portable terminal. The front surface of the first body 100 is divided into a speaker mount space P for mounting the speaker 104 and a display mount space Q for mounting the display 102. A sound emission hole 106 is formed at the front surface of the first body 100 to emit a sound emitted from the speaker 104 to the exterior of the first body 100.

The portable terminal according to the related art also includes a second body 110 openably coupled to the first body 100 via a hinge connection. The second body includes a keypad 112 configured to generate input, the keypad 112 being located at a front surface of the second body 110, and a battery 116 configured to supply power, the battery 116 being located at a rear surface of the second body 110. As shown, a main printed circuit board 114 is located inside the second body 110, and a microphone 118 for inputting a sound is mounted at a lower portion of the second body 110.

As a result of current trends, the portable terminal has become increasingly smaller in size to be more easily carried. At the same time, as more functions are added, such as, for example, satellite DMB (Digital Multimedia Broadcasting) services, there has been a tendency to try to increase the size of a display to display information.

However, because related art portable terminal has the sound emission hole at the front surface of the first body where the display is mounted for emitting sound generated by the receiver to the exterior of the portable terminal, the sound emission hole limits the ability to increase size of the display.

BRIEF SUMMARY OF THE INVENTION

Accordingly, in order to solve the above-mentioned problems, an object of the present invention is to provide a portable terminal which is small in size and implements a large display by removing a sound emission hole at a front surface of a body and implementing a display screen at the entire front surface of the body.

To achieve these and other advantages and in accordance with the purpose of the present invention, as embodied and broadly described herein, a portable terminal in provided. The portable terminal includes a body having a front surface, the front surface having an upper portion and a lower portion, a display unit located in the body and visible at the front surface thereof, the display unit having a first end and a second end, and at least one of the first end being adjacent the upper portion and the second end being adjacent the lower portion, and a speaker unit located in the body, the speaker unit including a bone conduction speaker.

In another aspect, the upper portion may include an upper end, and the first end of the display unit may be located adjacent the upper end of the upper portion. The upper end of the upper portion may form an edge of the body, and the first end of the display unit may be adjacent the edge of the body.

In a different aspect, the portion of the front surface between the first end of the display unit and the upper portion may be uninterrupted. The portion of the front surface between the second end of the display unit and the lower portion may be uninterrupted.

In yet another aspect, the front surface may be uninterrupted.

In still another aspect, the portable terminal may include a touch screen located at a front surface of the display unit to generate input when touched.

In another aspect, the portable terminal may include a circuitry supporting substrate having an upper portion and a lower portion, and the bone conduction speaker may be located at the upper portion of the circuitry supporting substrate. In addition, the portable terminal may include a built-in antenna located at the lower portion of the circuitry supporting substrate.

In a different aspect, the bone conduction speaker may be located at a position in the body that is the closest to the part that will be contacted with a user's face when the body is contacted with the user's face.

In yet another aspect, the body may include an upper rear portion opposite the upper portion of the front surface, the bone conduction speaker may include a transducer, and the bone conduction speaker may be located in the upper rear portion such that the transducer of the speaker contacts the upper rear portion.

In still another aspect, the display unit may include a rear surface, and the bone conduction speaker may contact the rear surface of the display unit.

In another aspect, the bone conduction speaker may include a transducer that vibrates the body when the portable terminal is set in a silent mode.

In another aspect, the speaker unit may be configured to function as an air conduction speaker. The body may include a rear surface, and a sound emission hole located in the rear surface to emit a sound to the exterior of the portable terminal when the speaker unit is used as the air conduction speaker.

According to principles of the present invention, a portable terminal is provided. The portable terminal includes a body having a front surface, the front surface having an upper portion and a lower portion, a display unit located in the body and is visible at the front surface thereof, the display unit having an first end and a second end, and at least one of the first end is adjacent the upper portion and the second end being adjacent the lower portion, a second body having a keypad, the second body being connected to the first body such that the second body is moveable with respect to the first body, and a speaker unit located in one of first body and the second body, the speaker unit including a bone conduction speaker.

In another aspect, the second body includes an upper rear portion and a lower rear portion, and the bone conduction speaker includes a transducer located at the upper rear portion of the second body to be contacted with the upper rear portion of the second body.

In a further aspect, the portable terminal includes a slide module connecting the first body to the second body.

In another aspect, the portable terminal includes a hinge portion, the first body and the second body being pivotally connected by the hinge connecting portion, and the bone conduction speaker including a transducer disposed to contact the hinge connecting portion.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 2:
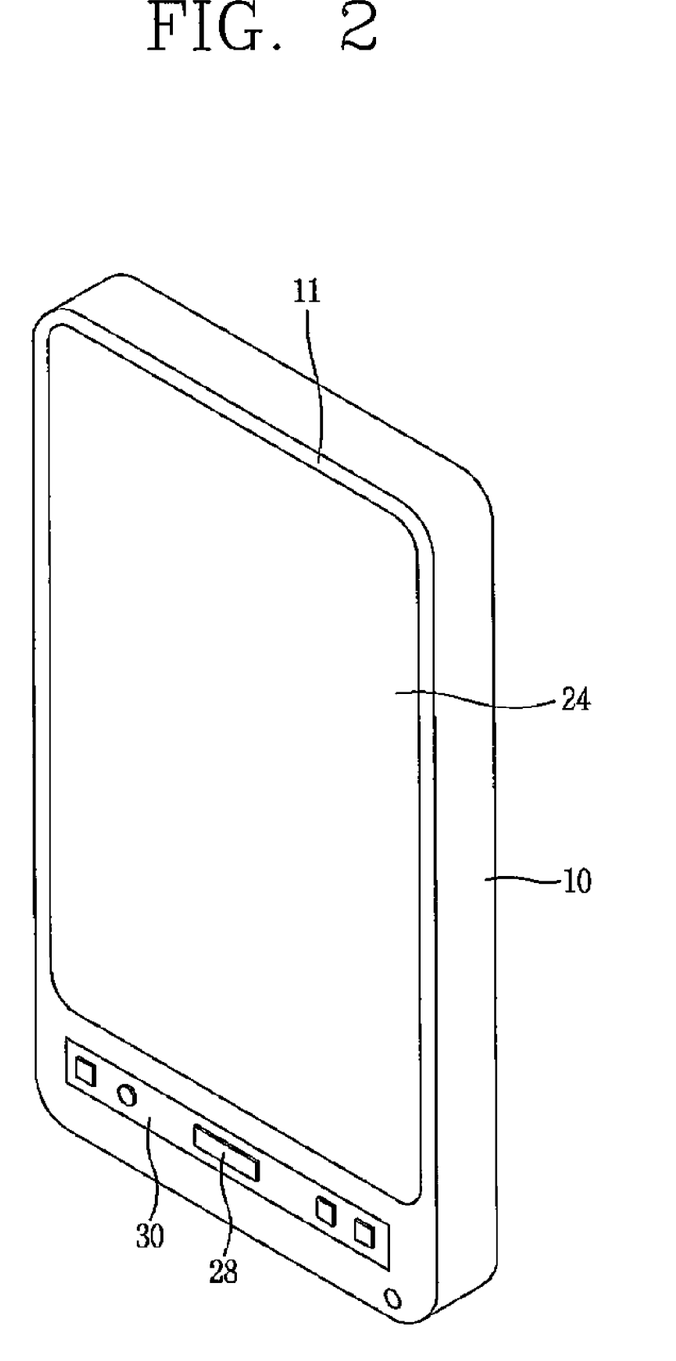
FIG. 2 is a perspective view showing the portable terminal according to a first embodiment of the present invention.
Figure 3:
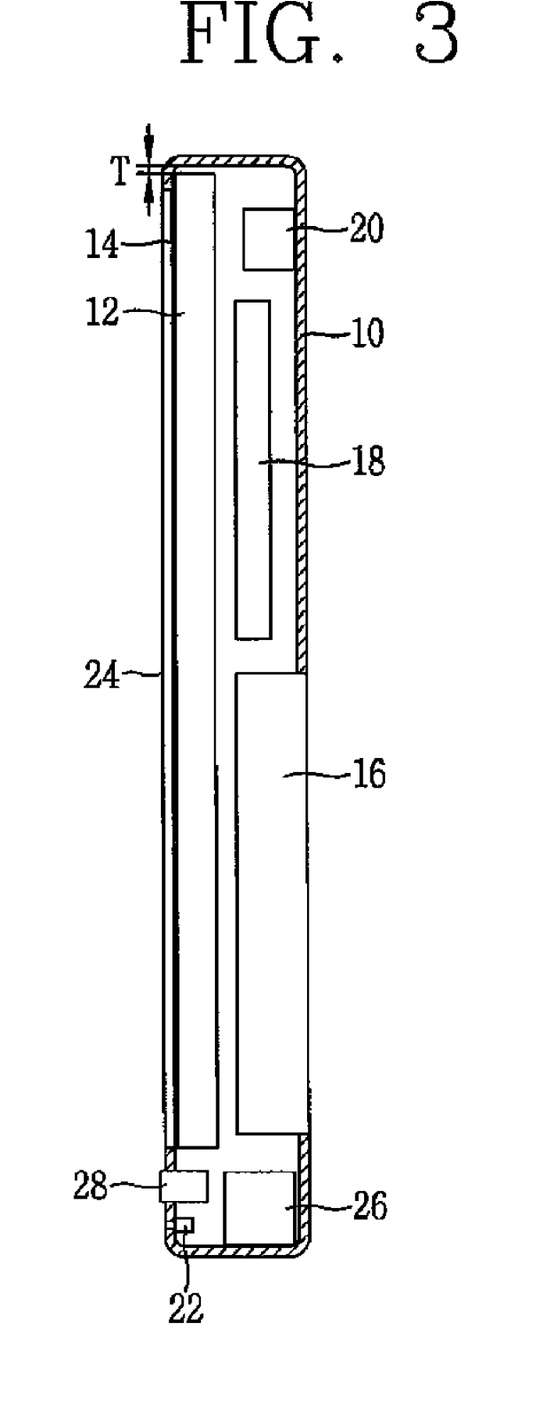
FIG. 3 is a schematic sectional view showing the portable terminal of FIG. 2.

FIG. 2 is a perspective view showing a portable terminal according to a first embodiment of the present invention, and FIG. 3 is a schematic sectional view of the portable terminal of FIG. 2.

The portable terminal according to the present invention includes a body 10, a display unit 12 located in the body 10 to display information, a touch screen 14 attached to a front surface of the display unit 12 to generate input when being touched, a battery 16 detachably located at a rear surface of the body 10 to supply power, a speaker unit 20 including a bone conduction speaker 20 located in the body 10 to transmit a sound through bone conduction, and a microphone 22 located at a lower portion of the body 10 to input a sound.

A display window 24 is located at the front surface 11 of the body 10 so as to show information displayed in the display unit 12 to the exterior. A circuitry supporting substrate (CSS), for example, a main printed circuit board 18, is located inside the body 10 to mount various circuit components such as a communication module and the like thereto.

As shown in FIG. 2, the front surface 11 has an upper portion and a lower portion, and the display unit 12 includes at least one of a first end located adjacent the upper portion of the front surface 11 and a second end located adjacent the lower portion of the front surface 11. Both sides of the display unit 12 in a widthwise direction are disposed adjacent to front edges of the body 10.

Distance T between one of the first and second ends of the display unit 12 and the front edge of the body 10 can be minimized by removing a speaker mount portion, which is formed at the front surface of the body in the related art. Similarly, the speaker hole, which is formed at the front surface of the terminal body in the related art, can be removed to provide an uninterrupted surface. Accordingly, the display unit 12 can be implemented, maintaining the size of the body 10.

When key buttons 28 are mounted at the front surface 11 of the body 10, the first end of the display unit 12 in the lengthwise direction is disposed adjacent to the edge of the body 10. When the key buttons are disposed at the side of the body 10 and there is no key buttons at the front surface of the body, both the first and second ends of the display unit 12 in the lengthwise direction are disposed adjacent to the edges of the body 10, respectively, thus to implement a large display screen.

A built-in antenna 26 is located at the lower portion of the body 10 to transmit/receive frequencies, and the key buttons 28 are mounted at the front surface of the lower portion of the body 10 to generate input when being pressed. The key buttons 28 are pressably mounted at a panel 30, which is formed as a band in a widthwise direction of the body 10. In addition to the key buttons 28 being pressed to generate input, touch keys may be also be used to generate input when being touched.

The bone conduction speaker of the speaker unit 20 uses a bone conduction phenomenon that sound bypasses the tympanum and is conducted to the skull and then transmitted directly to the internal ear, in contrast with "air conduction," in which the atmospheric sound is transmitted to the internal ear through the external auditory meatus, the tympanum, and the auditory ossicle.

A bone conduction transducer is attached to the bone conduction speaker of the speaker unit 20. The bone conduction transducer serves as a vibration speaker that transmits the sound by converting an electric signal into a vibration signal.

Preferably, the bone conduction speaker of the speaker unit 20 is located at a position of the body 10 that is closest to the part being contacted with a user's face when the user contacts the body 10 to make a call.

That is, as shown in FIG. 2, the bone conduction speaker of the speaker unit 20 is located in an upper rear portion of the body 10 opposite the upper portion of the front surface 11. A vibration generated by the bone conduction transducer is transmitted to the facial bones through the body 10, in a state that the inner surface of the body 10 and the bone conduction transducer are contacted with each other in the upper rear portion of the body 10.

The bone conduction speaker of the speaker unit 20 may also perform the function to vibrate the body 10 when a ring-tone mode is changed into a silent mode. Accordingly, any additional transducer used in the silent mode is not required by the body 10. And, a speaker (not shown) for emitting the sound to the exterior in ring-tone mode may be separately mounted inside the body 10 to notify a user of an incoming call.

As seen in FIG. 3, the display unit 12 is located at a front direction of the body 10 so as to implement a display screen at the entire front surface of the body 10, and the CSS 18 is located at the rear surface of the display unit 12. The bone conduction speaker 20 is located at the upper portion of the CSS 18, and the battery 16 is detachably located at the lower portion of the CSS 18. The built-in antenna 26 is located at the lower portion of the battery 16. In addition, the microphone 22 for inputting a sound is located at one side of the lower end of the body 10.

In this arrangement, the bone conduction speaker of the speaker unit 20 is electrically connected to the CSS 18. The bone conduction transducer is located to contact the body 10. And, the built-in antenna 26 is electrically connected to a communication module (not shown), which is located at the CSS 18.

As described above, if a user contacts his face with the body 10 to make a call, vibration generated from the bone conduction transducer of the bone conduction speaker of the speaker unit 20 is conducted to the user's facial bones through the body 10 and then directly transmitted to the internal ear. Accordingly, the user can hear the sound through bone conduction.

Since the portable terminal according to the present embodiment transmits the sound through bone conduction by having the bone conduction speaker of the speaker unit 20 within the body 10, a conventional speaker for emitting a sound is not required to be at the front surface of the body. Accordingly, the entire front surface of the body 10 can be used as the display screen of the body, thereby implementing a large display screen without increasing the size of the portable terminal.

Figure 4:
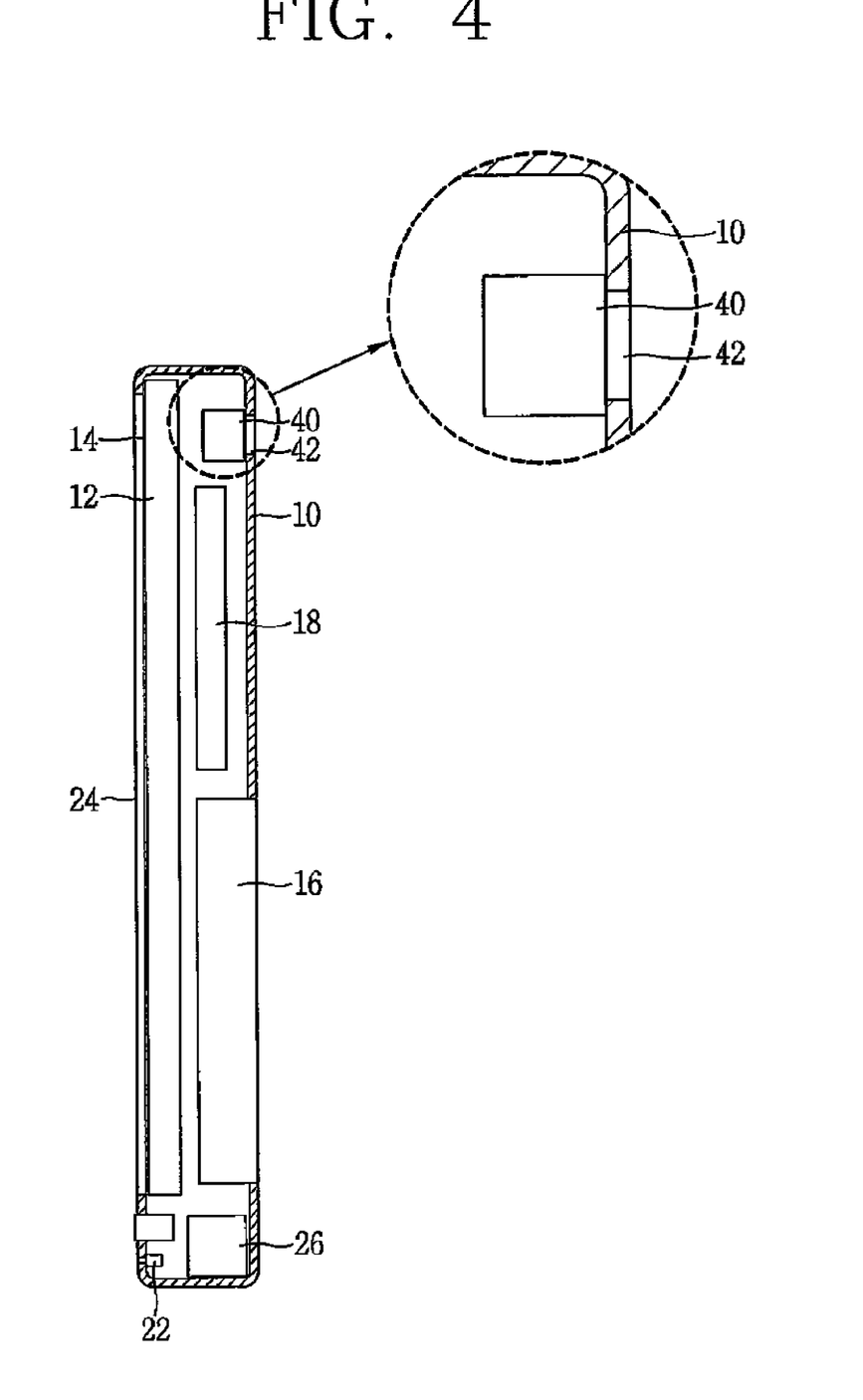
FIG. 4 is a schematic sectional view showing the portable terminal according to a second embodiment of the present invention.

FIG. 4 is a schematic sectional view showing the portable terminal according to a second embodiment of the present invention. The portable terminal according to the second embodiment is substantially the same as that described in the first embodiment, except that the speaker unit 40 can transmit a sound through air conduction as well as through bone conduction.

That is, the speaker unit 40 according to the second embodiment has a structure such that the transducer can transmit a sound through both bone conduction and air conduction. Different voltages can be applied to the transducer based on whether the sound is transmitted through bone conduction or through air conduction.

In addition, when the speaker unit 40 is operated as an air conduction speaker, a sound emission hole 42 may be formed at a rear surface of the body 10 to emit the sound generated by the transducer to the exterior of the body 10.

When the portable terminal according to the second embodiment is used to make a call, the speaker unit 40, functioning as a bone conduction speaker, transmits vibration generated from the transducer of the speaker unit 40 to the skull through the body 10. Accordingly, the user can hear the sound.

Further, when the portable terminal is used to listen to music such as, for example, an MP3, the speaker unit 40, functioning as the air conduction speaker, exits the sound to the exterior through the sound emission hole 42 formed at the rear surface of the body 10.

Finally, when the speaker unit 40 is used as an air conduction speaker, it is operated in ring-tone mode. When the speaker 40 is used as the bone conduction speaker, it is operated in silent mode.

Figure 5:
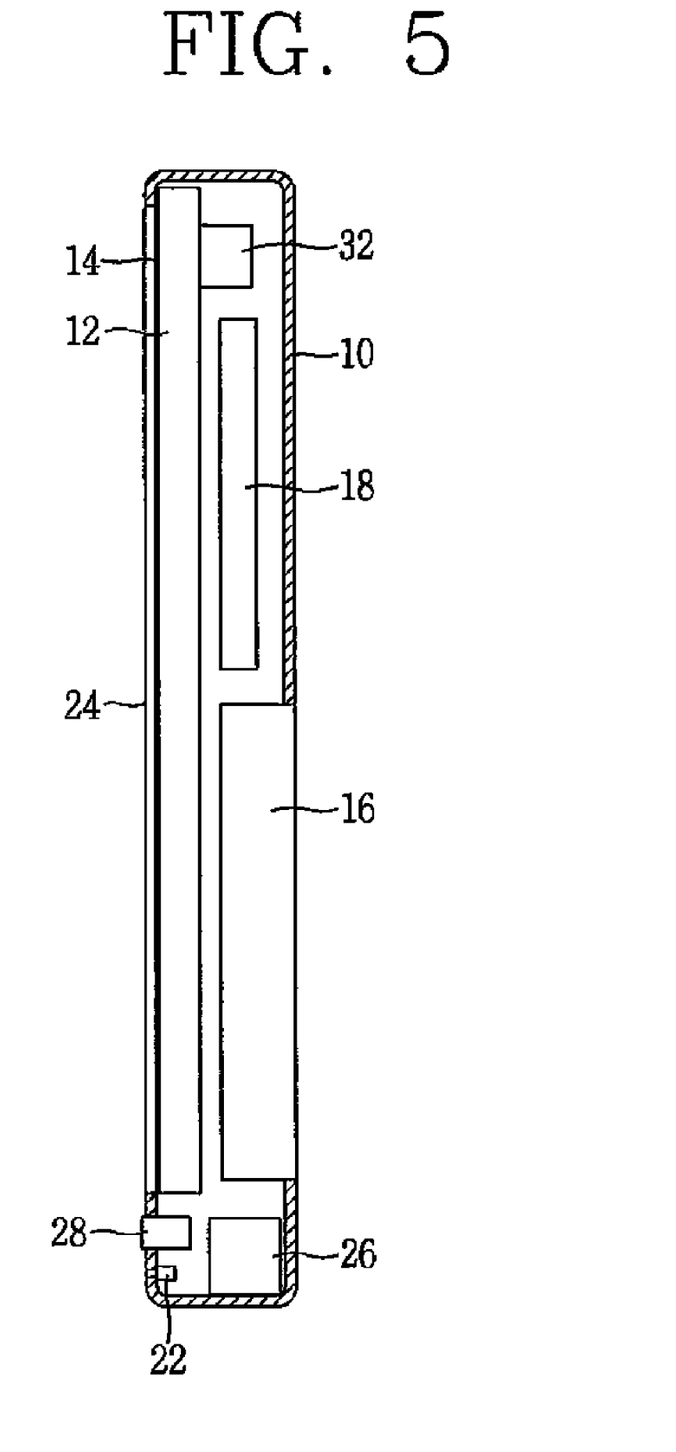
FIG. 5 is a schematic sectional view showing the portable terminal according to a third embodiment of the present invention.

FIG. 5 is a schematic sectional view showing the portable terminal according to a third embodiment of the present invention. The portable terminal according to the third embodiment is similar to that described in the first embodiment, except that the speaker unit 32 is attached to a rear surface of the display unit 12.

That is, the bone conduction speaker of the speaker unit 32 according to the third embodiment is located at the rear surface of the display unit 12, and the bone conduction transducer of the bone conduction speaker 32 is contacted with the rear surface of the display unit 12, thereby transmitting vibration generated by the bone conduction transducer to the facial bones through the display unit 12 and the body 10.

Figure 6:
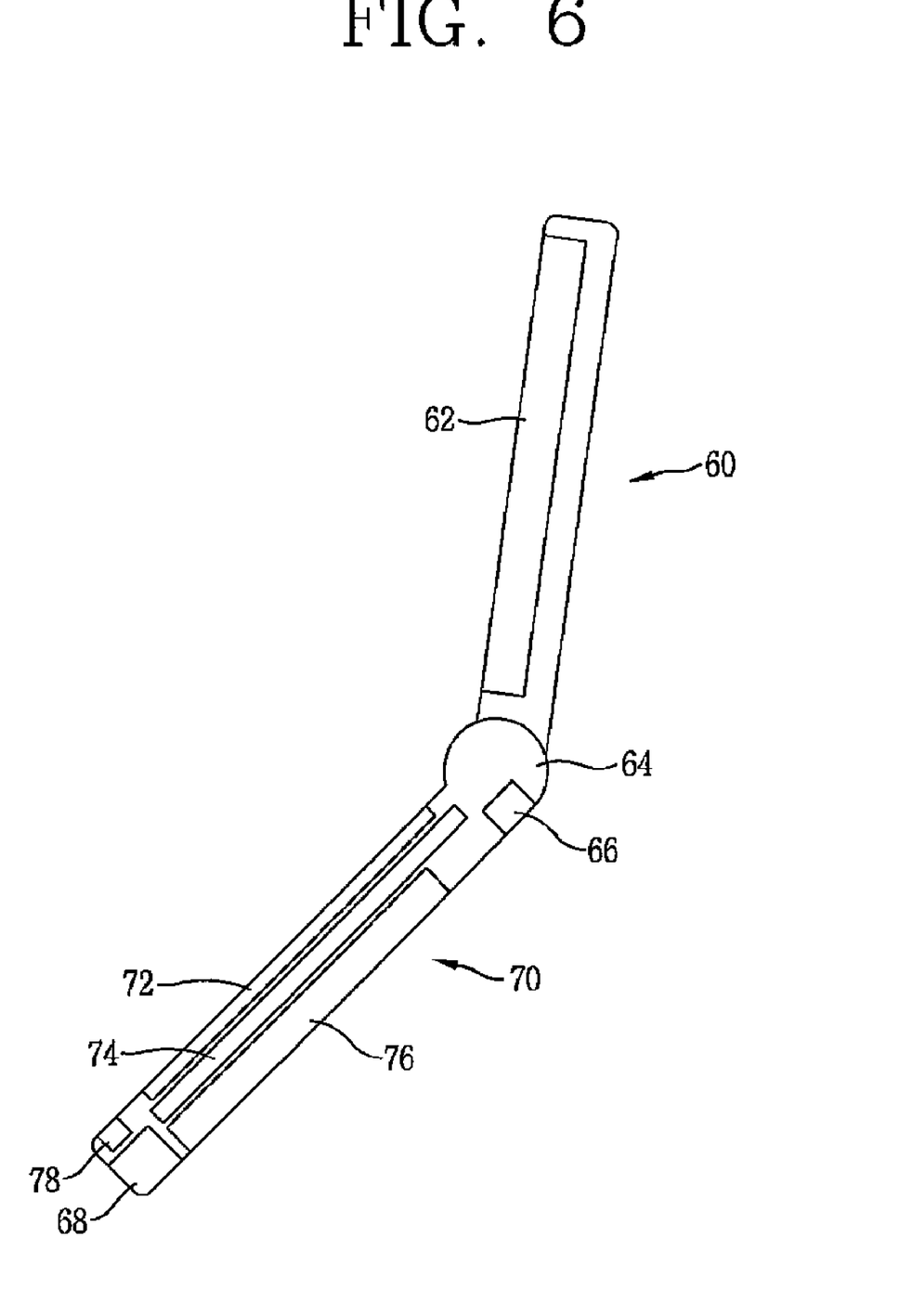
FIG. 6 is a schematic sectional view showing the portable terminal according to a fourth embodiment of the present invention.

FIG. 6 is a schematic sectional view showing the portable terminal according to a fourth embodiment of the present invention. The portable terminal according to the fourth embodiment includes a first body 60 having a display unit 62 for displaying information at a front surface of the first body 60; and a second body 70 rotatably coupled to the first body 60 by a hinge-connecting portion 64. The second body includes a keypad 72 configured to generate input at a front surface of the second body 70, a CSS 74 mounted inside the second body 70, and a battery 76 detachably mounted at a rear surface of the second body 70 to supply power. A microphone 78 for inputting a sound and a built-in antenna 68 for transmitting/receiving frequencies are located at a lower portion of the second body 70.

A speaker unit 66 including a bone conduction speaker is located in one of the first body 60 and the second body 70 to transmit a sound through bone conduction. The bone conduction speaker described in either the first embodiment or in the second embodiment may be applied to the bone conduction speaker of the speaker unit 66. Herein, if the speaker unit according to the second embodiment is applied, a sound emission hole is formed at the rear surface of the second body 70 to emit the sound.

As shown in FIG. 6, the bone conduction speaker of the speaker unit 66 is located at an upper rear surface of the second body 70. A transducer of the speaker unit 66 is disposed to contact the second body 70.

The bone conduction speaker of the speaker unit 66 may be located at one side of the hinge-connecting portion 64 where the first body 60 and the second body 70 are connected. Alternatively, the transducer of the bone conduction speaker 66 may be located to contact the hinge-connecting portion 64.

The display unit 62 is can be sized to implement a display screen at an entire front surface of the first body 60. That is, a large display screen is implemented such that the conventional sound emission hole is removed from the front surface of the first body 60.

Referring to FIG. 6, the portable terminal is opened by rotating the first body 60 to make a call. Then, if the first body 60 and the second body 70 are contacted with a user's face, vibration generated by the transducer of the bone conduction speaker of the speaker unit 66 located in the second body 70 is conducted to the facial bones through the second body 70. Accordingly, the sound is transferred to the user.

Figure 7:
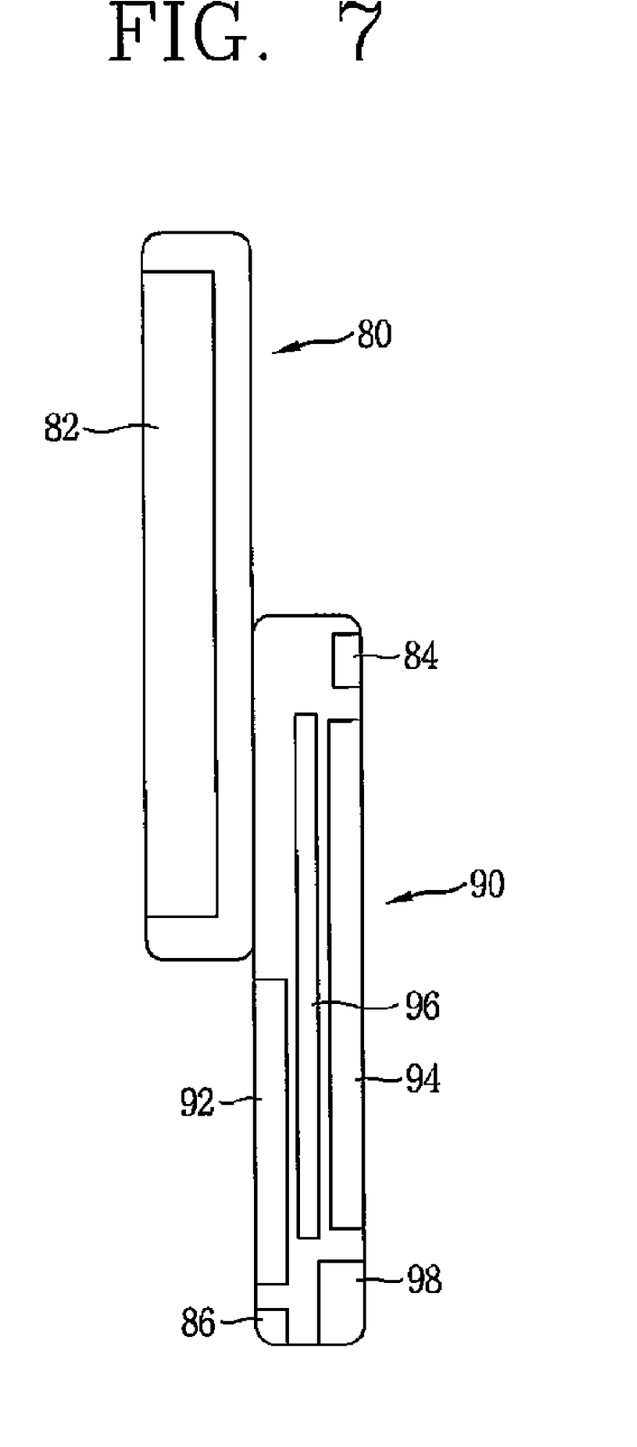
FIG. 7 is a schematic sectional view showing the portable terminal according to a fifth embodiment of the present invention.

FIG. 7 is a schematic sectional view showing the portable terminal according to a fifth embodiment of the present invention. The portable terminal includes a first body 80 having a display unit 82 configured to implement a display screen at an entire front surface of the first body 80; a second body 90 mounted at the first body 80 to be slid up/down with respect thereto. The second body 90 includes a keypad 92 located at a front surface of the second body 90 for generating input and a battery 94 mounted at a rear surface of the second body 90 for supplying power. A speaker unit 84 including a bone conduction speaker is located in one of the first body 80 and the second body 90 for transmitting a sound through bone conduction.

A built-in antenna 98 for transmitting/receiving frequencies and a microphone 86 for inputting a sound are located at a lower portion of the second body 90. The display unit 82 is can be sized to implement a display screen at an entire front surface of the first body 80. That is, a portion where a conventional speaker would normally be disposed at the front surface of the first body 80 can be occupied by a display screen, thereby implementing a large display screen.

The bone conduction speaker of the speaker unit described in either the first embodiment or the second embodiment can be applied to the bone conduction speaker of the speaker unit 84. The bone conduction speaker of the speaker unit 84 is located at an upper rear portion of the second body 90, and a transducer of the speaker unit 84 is disposed to contact second body 90.

According to the fifth embodiment, the portable terminal is opened by sliding up the fist body 80 to make a call. Then, if the first body 80 and the second body 90 are contacted with a user's face, vibration generated by the transducer of the bone conduction speaker of the speaker unit 84, which is located in the second body 90, is conducted to the facial bones through the second body 90. Accordingly, the sound is transferred to the user.

The present invention may also be applied to any portable terminals, other than those described in the preferred embodiments of the present invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The portable terminal according to the present invention can implement a large display screen without increasing the terminal size, by having the bone conduction speaker inside the body for transmitting a sound through bone conduction such that the sound emission hole formed at the front surface of the body is removed to allow for a larger display screen.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A portable terminal comprising:
    a body having a front surface, the front surface having an upper portion and a lower portion;
    a display unit located in the body and visible at the front surface thereof, the display unit having a first end and a second end, and the first end being adjacent the front surface upper portion and the second end being adjacent the front surface lower portion;
    a speaker unit located in the body behind the display unit, and below the first end of the display unit;
    a circuitry supporting substrate having an upper portion and a lower portion, and the speaker unit being located at the upper portion of the circuitry supporting substrate; and
    a built-in antenna located at the lower portion of the circuitry supporting substrate,
    wherein an upper end of the front surface upper portion forms an edge of the body, and the first end of the display unit is adjacent the edge of the body,
    wherein a portion of the front surface between the first end of the display unit and the front surface upper portion is uninterrupted,
    wherein the body includes an upper rear portion opposite the upper portion of the front surface, the speaker unit includes a transducer, and the speaker unit is located in the upper rear portion such that the transducer of the speaker unit contacts the upper rear portion,
    wherein the speaker unit is located at a position in the body that is the closest to the part that will be contacted with a user's face when the body is contacted with the user's face, and
    wherein the transducer is configured to generate vibrations conducted to a user's facial bones through the body so as to transmit a sound to the user.

2. The portable terminal according to claim 1, wherein a portion of the front surface between the second end of the display unit and the front surface lower portion is uninterrupted.

3. The portable terminal according to claim 1, wherein the front surface is uninterrupted.

4. The portable terminal according to claim 1, further comprising a touch screen located at a front surface of the display unit to generate input when touched.

5. The portable terminal according to claim 1, wherein the display unit includes a rear surface, and the speaker unit contacts the rear surface of the display unit.

6. The portable terminal according to claim 1, wherein the speaker unit includes a transducer that vibrates the body when the portable terminal is set in a silent mode.

7. The portable terminal according to claim 1, wherein the speaker unit is configured to function as an air conduction speaker.

8. The portable terminal of claim 7, wherein the body includes:
    a rear surface; and
    a sound emission hole located in the rear surface to emit a sound to the exterior of the portable terminal when the speaker unit is used as the air conduction speaker.

9. A portable terminal comprising:
    a first body having a front surface, the front surface having an upper portion and a lower portion;
    a display unit located in the first body and visible at the front surface thereof, the display unit having an first end and a second end, and the first end being adjacent the upper portion and the second end being adjacent the lower portion;
    a second body having a key pad, the second body being connected to the first body such that the second body is moveable with respect to the first body; and
    a speaker unit located in the first body, the speaker unit including a bone conduction speaker,
    wherein the speaker unit is behind the display unit, below the first end of the display unit and above the second end of the unit,
    wherein an upper end of the front surface upper portion forms an edge of the body, and the first end of the display unit is adjacent the edge of the body,
    wherein a portion of the front surface between the first end of the display unit and the front surface upper portion is uninterrupted,
    wherein the body includes an upper rear portion opposite the upper portion of the front surface, the speaker unit includes a transducer, and the speaker unit is located in the upper rear portion such that the transducer of the speaker unit contacts the upper rear portion,
    wherein the speaker unit is located at a position in the body that is the closest to the part that will be contacted with a user's face when the body is contacted with the user's face, and wherein the transducer is configured to generate vibrations conducted to a user's facial bones through the body so as to transmit a sound to the user.

10. The portable terminal according to claim 9, wherein the second body includes an upper rear portion and a lower rear portion, and the bone conduction speaker includes a transducer located at the upper rear portion of the second body to be contacted with the upper rear portion of the second body.

11. The portable terminal according to 10, further comprising a slide module connecting the first body to the second body.

12. The portable terminal according to claim 9, further comprising a hinge portion, the first body and the second body being pivotally connected by the hinge portion, and the bone conduction speaker including a transducer disposed to contact the hinge portion.

13. A portable terminal comprising:
- a body having a front surface, the front surface having an upper end portion and a lower end portion;
- a display unit located in the body and visible at the front surface thereof, the display unit having a first end and a second end, and the first end being adjacent the upper end portion; and
- a bone conduction speaker disposed at a rear side of the display unit and within the body,
- wherein the bone conduction speaker is behind the display unit, below the first end of the display unit and above the second end of the unit,
- wherein an upper end of the front surface upper portion forms an edge of the body, and the first end of the display unit is adjacent the edge of the body,
- wherein a portion of the front surface between the first end of the display unit and the front surface upper portion is uninterrupted,
- wherein the body includes an upper rear portion opposite the upper portion of the front surface, the speaker unit includes a transducer, and the speaker unit is located in the upper rear portion such that the transducer of the speaker unit contacts the upper rear portion,
- wherein the speaker unit is located at a position in the body that is the closest to the part that will be contacted with a user's face when the body is contacted with the user's face, and
- wherein the transducer is configured to generate vibrations conducted to a user's facial bones through the body so as to transmit a sound to the user.

14. The portable terminal according to claim 13, wherein the portion of the front surface between the first end of the display unit and the upper portion is uninterrupted.

15. The portable terminal according to claim 14, wherein the portion of the front surface between the second end of the display unit and the lower portion is uninterrupted.

16. The portable terminal according to claim 13, wherein the front surface is uninterrupted.

17. The portable terminal according to claim 13, further comprising a touch screen located at a front surface of the display unit to generate input when touched.

\* \* \* \* \*